Patented Nov. 3, 1936

2,059,497

UNITED STATES PATENT OFFICE 2,059,497

ALUMINIUM SOLDER

Friedrich Strasser, Basel, Switzerland

No Drawing. Application June 2, 1936, Serial No. 83,157. In Switzerland June 5, 1935

1 Claim. (Cl. 75—175)

This invention relates to a solder for thin aluminium plates and is characterized in this that the solder consists of tin, cadmium, silver and aluminium.

The solder may for example have the following composition which is particularly effective:

60% tin, 25% cadmium, 7.5% silver and 7.5% aluminium. The percentages given are percentages by weight. The percentages of the individual constituent parts may be varied within certain limits.

The new solder is particularly suitable for soldering thin aluminium plates of a thickness up to 5 mm., such as are used for instance for household articles and decorative purposes, for example ornamental work on houses, roof gutters and the like.

It has a very low fusing point which lies between 180 and 200° C. The danger of burning the work is thereby eliminated. The solder flows very easily, which is accounted for the addition of cadmium and silver. The cadmium provides the further advantage, that it causes a better adhesion of the solder to the article to be soldered and renders the soldered place sufficiently hard. There is also the advantage, that the soldered place is perfectly smooth and any subsequent cleaning operation is unnecessary. The soldered place need not therefore be polished. As compared with solders containing zinc there is the advantage, that the solder does not scale off and in colour retains the colour of the aluminium, whereas the solders containing zinc soon discolour and contain undesirable occlusions.

It was hitherto necessary to apply to aluminium plates to be soldered a flux, such as stearin, resin or similar, substances, for causing the solders to flow more readily. With the new solder described above this is not necessary.

I claim:—

A solder for aluminium plates consisting of 60% tin, 25% cadmium, 7.5% silver and 7.5% aluminium.

FRIEDRICH STRASSER.